(12) United States Patent
Manolakos et al.

(10) Patent No.: US 11,160,038 B2
(45) Date of Patent: Oct. 26, 2021

(54) ENHANCED POWER HEADROOM REPORT FOR FEEDING BACK BEAMFORMED SOUNDING REFERENCE SOURCE POWER SCALING

(71) Applicant: QUALCOMM Incorporated, San Diego, CA (US)

(72) Inventors: Alexandros Manolakos, San Diego, CA (US); Pavan Kumar Vitthaladevuni, San Diego, CA (US); Seyed Ali Akbar Fakoorian, San Diego, CA (US); Yi Huang, San Diego, CA (US); Yu Zhang, Beijing (CN); Taesang Yoo, Riverside, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/489,281

(22) PCT Filed: Mar. 30, 2018

(86) PCT No.: PCT/CN2018/081326
§ 371 (c)(1),
(2) Date: Aug. 27, 2019

(87) PCT Pub. No.: WO2018/177410
PCT Pub. Date: Oct. 4, 2018

(65) Prior Publication Data
US 2020/0120619 A1    Apr. 16, 2020

(30) Foreign Application Priority Data

Apr. 1, 2017 (WO) ................ PCT/CN2017/079358

(51) Int. Cl.
*H04B 7/0408* (2017.01)
*H04W 52/36* (2009.01)
(Continued)

(52) U.S. Cl.
CPC ........... *H04W 52/367* (2013.01); *H04L 5/001* (2013.01); *H04L 5/005* (2013.01); *H04W 24/10* (2013.01);
(Continued)

(58) Field of Classification Search
CPC ............ H04W 52/365; H04W 52/146; H04W 52/242; H04W 52/08; H04W 52/10; H04L 25/0226
See application file for complete search history.

(56) References Cited

U.S. PATENT DOCUMENTS

2014/0219234 A1    8/2014  Kim et al.
2015/0201383 A1*   7/2015  Papasakellariou .. H04W 52/146
                                                      370/278
2020/0145079 A1*   5/2020  Marinier ............ H04B 7/0456

FOREIGN PATENT DOCUMENTS

CN    101848538 A    9/2010
CN    103477679 A    12/2013
(Continued)

OTHER PUBLICATIONS

International Search Report and Written Opinion—PCT/CN2017/079358—ISA/EPO—dated Jan. 3, 2018.
(Continued)

*Primary Examiner* — Tu X Nguyen
(74) *Attorney, Agent, or Firm* — Arent Fox, LLP

(57) ABSTRACT

Various aspects are described for an enhanced power headroom report (PHR) for feeding back beamformed sounding reference signal (SRS) power scaling. Beamformed SRS along directions where a user equipment (UE) can best nullify interference/maximize downlink (DL) signal to interference plus noise ratio (SINR) would be very helpful for DL beamforming. SRS beamforming requires additional support, if rank related decisions are being made at eNB. For example, power normalization factors need to be sent or
(Continued)

reported on the uplink (UL) to eNB. This disclosure provides examples of how the PHR on the uplink can be used to do such reporting. There are two types of PHR being proposed, one nominal for the UL-oriented SRS, like LTE-style PHR, and one for the DL-oriented SRS where the UE also reports or indicates the power normalization factors of each SRS port.

30 Claims, 5 Drawing Sheets

(51) Int. Cl.
| | | |
|---|---|---|
| | *H04L 5/00* | (2006.01) |
| | *H04W 24/10* | (2009.01) |
| | *H04W 52/14* | (2009.01) |
| | *H04W 52/32* | (2009.01) |
| | *H04W 52/54* | (2009.01) |

(52) U.S. Cl.
CPC ....... *H04W 52/143* (2013.01); *H04W 52/146* (2013.01); *H04W 52/325* (2013.01); *H04W 52/54* (2013.01)

(56) References Cited

FOREIGN PATENT DOCUMENTS

| | | |
|---|---|---|
| CN | 103813430 A | 5/2014 |
| CN | 105142227 A | 12/2015 |
| CN | 105580452 A | 5/2016 |
| CN | 105766034 A | 7/2016 |
| CN | 106160924 A | 11/2016 |
| CN | 106465300 A | 2/2017 |
| WO | 2016017705 A1 | 2/2016 |

OTHER PUBLICATIONS

International Search Report and Written Opinion—PCT/CN2018/081326—ISA/EPO—dated Jun. 27, 2018.
Huawei, et al., "Considerations on PHR", 3GPP Draft, 3GPP TSG-RAN WG2 Meeting #97bis, R2-1702606, 3rd Generation Partnership Project (3GPP), vol. RAN WG2, No. Spokane, Washington, USA, Apr. 3-7, 2017, Mar. 25, 2017 (Mar. 25, 2017), XP051254175, 6 Pages, Retrieved from the Internet: URL: http://www.3gpp.org/ftp/tsg_ran/WG2_RL2/TSGR2_97bis/Docs/, [retrieved Mar. 25, 2017], paragraph [0001], paragraph [0002], paragraph [0004], figure 1.
Interdigital Communications: "Power Headroom Reporting for NR". 3GPP Draft, 3GPP TSG-RAN WG2 #97bis, R2-1703090 (R15 NR WI AI10315 PHR, 3rd Generation Partnership Project (3GPP), Mobile Competence Centre, 650, Route Des Lucioles, F-06921 Sophia-Antipolis Cedex, France, vol. RAN WG2, No. Spokane, Washington, USA, Apr. 3-7, 2017, Mar. 25, 2017 (Mar. 25, 2017), XP051254381, pp. 1-2, Retrieved from the Internet: URL: http://www.3gpp.org/ftp/tsg_ran/WG2_RL2/TSGR2_97bis/Docs/, [retrieved Mar. 25, 2017], paragraph.
Nokia, et al., "UL Power Control for MIMO", 3GPP Draft, 3GPP TSG RAN WG1#88 bis, R1-1705978, 3rd Generation Partnership Project (3GPP), Mobile Competence Centre, 650, Route Des Lucioles, F-06921 Sophia-Antipolis Cedex, France, vol. Ran WG1, No. Spokane, WA, USA, Apr. 3-7, 2017, Mar. 24, 2017 (Mar. 24, 2017), XP051250800, 6 pages, Retrieved from the Internet: URL:http://www.3gpp.org/ftp/tsg_ran/WG1_RL1/TSGR1_88b/Docs/ [retrieved Mar. 24, 2017].
Supplementary European Search Report—EP18775355—Search Authority—Munich—dated Dec. 21, 2020.

* cited by examiner

ENHANCED POWER HEADROOM REPORT FOR FEEDING BACK BEAMFORMED SOUNDING REFERENCE SOURCE POWER SCALING

CROSS-REFERENCE TO RELATED APPLICATION

This application is a 35 U.S.C. § 371 National Phase of PCT Application No. PCT/CN2018/081326, filed on Mar. 30, 2018, which claims priority to PCT Application No. PCT.CN2017/079358, filed on Apr. 1, 2017. The disclosures of the priority applications are hereby incorporated in their entirety by reference.

BACKGROUND

Aspects of the present disclosure relate generally to wireless communication networks, and more particularly, to an enhanced power headroom report (PHR) for feeding back beamformed sounding reference signal (SRS) power scaling.

Wireless communication networks are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as new radio (NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in NR communications technology and beyond may be desired.

For example, for NR communications technology and beyond, current SRS power scaling reporting solutions may not provide a desired level of speed or customization for efficient operation. Thus, improvements in wireless communication operations may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. The sole purpose of the summary is to present some concepts of one or more aspects in a simplified form as a prelude to the more detailed description that is presented later.

Various aspects are described for an enhanced power headroom report (PHR) for feeding back beamformed sounding reference signal (SRS) power scaling. Beamformed SRS along directions where a user equipment (UE) can best nullify interference/maximize downlink (DL) signal to interference plus noise ratio (SINR) would be very helpful for DL beamforming. SRS beamforming requires additional support, if rank related decisions are being made at a base station such as an evolved node B (eNB). For example, power normalization factors need to be sent or reported on the uplink (UL) to the base station. In this disclosure it is shown how the PHR on the uplink can be used to do such reporting.

There are two types of PHRs being proposed in the disclosure, one being a nominal PHR (or Type 1 PHR) for a UL-centric SRS, like a Long Term Evolution-style (LTE-style) PHR, and one being a PHR (or Type 2 PHR) for a DL-centric SRS where the UE also reports the power normalization of each SRS port.

In an aspect, the present disclosure includes a method for wireless communications generating, by a UE, a PHR including first power information indicating a nominal power headroom value and second power information indicating a desired transmit power for each of multiple SRS ports of the UE, wherein the desired transmit power for one or more of the multiple SRS ports is different from a same transmit power used for an UL transmission on the multiple SRS ports; and transmitting, by the UE, the PHR to a base station.

In another aspect, the present disclosure includes a method for wireless communications receiving, at a base station and from a UE, a PHR including first power information indicating a nominal power headroom value and second power information; and identifying, from the second power information, a desired transmit power for each of multiple SRS ports of the UE, wherein the desired transmit power for one or more of the multiple SRS ports is different from a same transmit power used for an UL transmission on the multiple SRS ports.

Moreover, the present disclosure also includes apparatuses having components or configured to execute or means for executing the above-described methods, and computer-readable mediums storing one or more codes executable by a processor to perform the above-described methods.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
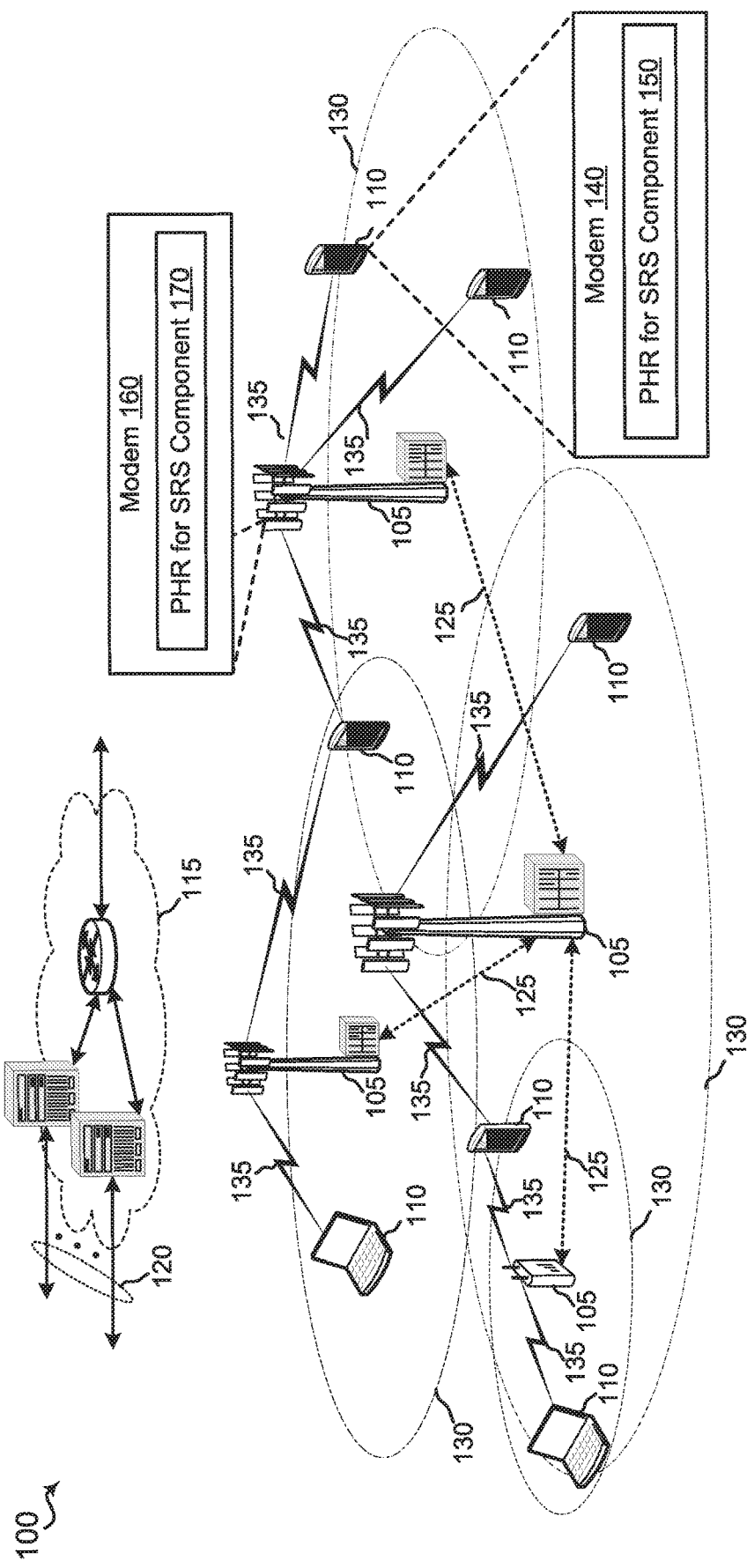
FIG. 1 is a schematic diagram of a wireless communication network including at least one user equipment (UE) and a base station according to this disclosure for an enhanced power headroom report (PHR) for feeding back beamformed sounding reference signal (SRS) power scaling.

Various aspects are now described with reference to the drawings. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

The present disclosure generally relates to an enhanced power headroom report (PHR) for feeding back beamformed sounding reference signal (SRS) power scaling.

Additional features of the present aspects are described in more detail below with respect to FIGS. 1-5.

It should be noted that the techniques described herein may be used for various wireless communication networks such as code-division multiple access (CDMA), time-division multiple access (TDMA), frequency-division multiple access (FDMA), orthogonal frequency-division multiple access (OFDMA), single-carrier frequency-division multiple access (SC-FDMA) systems, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to 5G networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Referring to FIG. 1, in accordance with various aspects of the present disclosure, an example wireless communication network 100 includes at least one user equipment (UE) 110 with a modem 140 having a power headroom report (PHR) for sounding reference signal (SRS) component 150 that provides an enhanced PHR for feeding back beamformed SRS power scaling. The PHR for SRS component 150 can handle uplink-oriented SRS and downlink-oriented SRS resource types. Further, wireless communication network 100 includes at least one base station 105 with a modem 160 having a PHR for SRS component 170 that receives and processes an enhanced PHR for feeding back beamformed SRS power scaling. The PHR for SRS component 170 can handle uplink-oriented SRS and downlink-oriented SRS resource types.

The wireless communication network 100 may include one or more base stations 105, one or more UEs 110, and a core network 115. The core network 115 may provide user authentication, access authorization, tracking, internet protocol (IP) connectivity, and other access, routing, or mobility functions. The base stations 105 may interface with the core network 115 through backhaul links 120 (e.g., S1, etc.). The base stations 105 may perform radio configuration and scheduling for communication with the UEs 110, or may operate under the control of a base station controller (not shown). In various examples, the base stations 105 may communicate, either directly or indirectly (e.g., through core network 115), with one another over backhaul links 125 (e.g., X1, etc.), which may be wired or wireless communication links.

The base stations 105 may wirelessly communicate with the UEs 110 via one or more base station antennas. Each of the base stations 105 may provide communication coverage for a respective geographic coverage area 130. In some examples, the base stations 105 may be referred to as a base transceiver station, a radio base station, an access point, an access node, a radio transceiver, a NodeB, eNodeB (eNB), gNB, Home NodeB, a Home eNodeB, a relay, or some other suitable terminology. The geographic coverage area 130 for the base station 105 may be divided into sectors or cells making up only a portion of the coverage area (not shown). The wireless communication network 100 may include base stations 105 of different types (e.g., macro base stations or small cell base stations, described below). Additionally, the plurality of base stations 105 may operate according to different ones of a plurality of communication technologies (e.g., 5G (New Radio or "NR"), fourth generation (4G)/Long Term Evolution (LTE), 3G, Wi-Fi, Bluetooth, etc.), and thus there may be overlapping geographic coverage areas 130 for different communication technologies.

In some examples, the wireless communication network 100 may be or include one or any combination of communication technologies, including a NR or 5G technology, an LTE or LTE-Advanced (LTE-A) or MuLTEfire technology, a Wi-Fi technology, a Bluetooth technology, or any other long or short range wireless communication technology. In LTE/LTE-A/MuLTEfire networks, the term evolved node B (eNB) may be generally used to describe the base stations 105, while the term UE may be generally used to describe the UEs 110. The wireless communication network 100 may be a heterogeneous technology network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may generally cover a relatively large geographic area (e.g., several kilometers in radius) and may allow unrestricted access by UEs 110 with service subscriptions with the network provider.

A small cell may include a relative lower transmit-powered base station, as compared with a macro cell, that may operate in the same or different frequency bands (e.g., licensed, unlicensed, etc.) as macro cells. Small cells may include pico cells, femto cells, and micro cells according to various examples. A pico cell, for example, may cover a small geographic area and may allow unrestricted access by UEs 110 with service subscriptions with the network provider. A femto cell may also cover a small geographic area (e.g., a home) and may provide restricted access and/or unrestricted access by UEs 110 having an association with the femto cell (e.g., in the restricted access case, UEs 110 in a closed subscriber group (CSG) of the base station 105, which may include UEs 110 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A user plane protocol stack (e.g., packet data convergence protocol (PDCP), radio link control (RLC), medium access control (MAC), etc.), may perform packet segmentation and reassembly to communicate over logical channels. For example, a MAC layer may perform priority handling and multiplexing of logical channels into transport channels. The MAC layer may also use hybrid automatic repeat/request (HARQ) to provide retransmission at the MAC layer to improve link efficiency. In the control plane, radio resource control (RRC) protocol layer may provide establishment, configuration, and maintenance of an RRC connection between a UE 110 and the base stations 105. The RRC protocol layer may also be used for core network 115 support of radio bearers for the user plane data. At the physical (PHY) layer, the transport channels may be mapped to physical channels.

The UEs 110 may be dispersed throughout the wireless communication network 100, and each UE 110 may be stationary or mobile. A UE 110 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 110 may be a cellular phone, a smart phone, a personal digital assistant (PDA), a wireless modem, a wireless communication device, a handheld device, a tablet computer, a laptop computer, a cordless phone, a smart watch, a wireless local loop (WLL) station, an entertainment device, a vehicular component, a customer premises equipment (CPE), or any device capable of communicating in wireless communication network 100. Additionally, a UE 110 may be Internet of Things (IoT) and/or machine-to-machine (M2M) type of device, e.g., a low power, low data rate (relative to a wireless phone, for example) type of device, that may in some aspects communicate infrequently with wireless communication network 100 or other UEs. A UE 110 may be able to communicate with various types of base stations 105 and network equipment including macro eNBs, small cell eNBs, macro eNBs, small cell eNBs, relay base stations, and the like.

A UE 110 may be configured to establish one or more wireless communication links 135 with one or more base stations 105. The wireless communication links 135 shown in wireless communication network 100 may carry uplink (UL) transmissions from a UE 110 to a base station 105, or downlink (DL) transmissions, from a base station 105 to a UE 110. The DL transmissions may also be called forward link transmissions while the UL transmissions may also be called reverse link transmissions. Each wireless communication link 135 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. In an aspect, the wireless communication links 135 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2). Moreover, in some aspects, the wireless communication links 135 may represent one or more broadcast channels.

In some aspects of the wireless communication network 100, base stations 105 or UEs 110 may include multiple antennas for employing antenna diversity schemes to improve communication quality and reliability between base stations 105 and UEs 110. Additionally or alternatively, base stations 105 or UEs 110 may employ multiple input multiple output (MIMO) techniques that may take advantage of multi-path environments to transmit multiple spatial layers carrying the same or different coded data.

The wireless communication network 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 110 may be configured with multiple downlink CCs and one or more uplink CCs for CA. CA may be used with both FDD and TDD component carriers. The base stations 105 and the UEs 110 may use spectrum up to Y MHz (e.g., Y=5, 10, 15, or 20 MHz) bandwidth per carrier allocated in a carrier aggregation of up to a total of Yx MHz (x=number of component carriers) used for transmission in each direction. The carriers may or may not be adjacent to each other. Allocation of carriers may be asymmetric with respect to DL and UL (e.g., more or less carriers may be allocated for DL than for UL). The CCs may include a primary CC and one or more secondary CCs. A primary CC may be referred to as a primary cell (PCell) and a secondary CC may be referred to as a secondary cell (SCell).

The wireless communications network 100 may further include base stations 105 operating according to Wi-Fi technology, e.g., Wi-Fi access points, in communication with UEs 110 operating according to Wi-Fi technology, e.g., Wi-Fi stations (STAs) via communication links in an unlicensed frequency spectrum (e.g., 5 GHz). When communicating in an unlicensed frequency spectrum, the STAs and AP may perform a clear channel assessment (CCA) or listen before talk (LBT) procedure prior to communicating in order to determine whether the channel is available.

Additionally, one or more of the base stations 105 and/or the UEs 110 may operate according to a NR or 5G technology referred to as millimeter wave (mmW or mmwave) technology. For example, the mmW technology includes transmissions in mmW frequencies and/or near mmW frequencies. Extremely high frequency (EHF) is part of the radio frequency (RF) in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. For example, the super high frequency (SHF) band extends between 3 GHz and 30 GHz, and may also be referred to as centimeter wave. Communications using the mmW and/or near mmW radio frequency band has extremely high path loss and a short range. As such, the base stations 105 and/or the UEs 110 operating according to the mmW technology may utilize beamforming in their transmissions to compensate for the extremely high path loss and short range.

The SRS can be used in a radio technology, such as LTE or NR, to sound the UL channel. Reference signals are transmitted by the UE 110 so that the base station 105 can determine characteristics of the UL channel. SRS may also be used for DL purposes. That is, the UE 110 transmits reference signals in the UL, but because there is reciprocity, the base station 105 learns about the UL channel and uses that knowledge to beamform on the DL channel by assuming that the channel is reciprocal.

In addition, the UE 110 may want to beamform the SRS to provide information as to the interference the UE 110 experiences but there may need to be some form of feedback mechanism to convey the desired actions of the UE 110 to the base station 105. One aspect that is proposed as part of this disclosure is to include the information as to the interference the UE 110 experiences using power control mechanisms. In connection with the wireless communication network 100 in FIG. 1, and for an enhanced PHR for feeding back the beamformed SRS power scaling, aspects of power control for SRS are described below.

The SRS transmit power follows that of the physical uplink shared channel (PUSCH), compensating for the exact bandwidth of the SRS transmission and with an additional power offset:

$$P_{SRS_{offset}}$$

Calculated power of SRS is given by the following expression:

$$P_{SRS\ calculated} = P_{SRS_{offset}} + 10\log(M_{SRS}) + P_{O_{PUSCH}} + \alpha P_L + f$$

where
$P_{SRS_{offset}}$ = the power offset of the SRS transmission over the PUSCH power target ($P_{O_{PUSCH}}$);
$M_{SRS}$ = the number of physical resource blocks (PRBs) sounding of PUSCH;
$P_{O_{PUSCH}}$ = a user-specific PUSCH power target;
$P_L$ = the estimated path loss (the UE 110 estimates the path loss based on the DL RS); and
f = a function used for closed-loop power control.
and where the number of PRBs correspond to a bandwidth of transmission.

Calculated power of PUSCH is given by the following expression:

$$P_{PUSCH\ calculated} = 10\log(M_{PUSCH}) + P_{O_{PUSCH}} + \alpha P_L + \Delta_{TF} + f$$

where
$\alpha$ = is the path loss compensation factor. In an example, a can be any one of {0, 0.4, 0.5, 0.6, 0.7, 0.8, 0.9, 1}. The specified value of $\alpha$ may come from a higher layer (e.g, SIB2) and may control some back-off on the path loss to be used for the power of PUSCH;
$M_{PUSCH}$ = is the number of RBs allocated to the UE for PUSCH; and
$\Delta_{TF}$ = is the modulation and coding scheme (MCS)-dependent parameter.

Actual power for SRS is given by the following expression:

$$P_{SRS} = \min\{P_{CMax}, P_{SRS\ calculated}\}$$

where
$P_{CMax}$ = the maximum transmit power.

In connection with the PHR, the power headroom indicates how much transmission power is left for the UE 110 to use in addition to the power being used by a current transmission. The power headroom is generally obtained as Power Headroom=UE Max Transmission Power−calculated PUSCH Power. That is, the power headroom or PH is obtained by the following expression:

$$PH = P_{CMax} - P_{SRS\ calculated}$$

In some radio technologies, such as LTE, the PHR is a type of MAC control element (CE) that reports the headroom between the current UE transmit (Tx) power (e.g., calculated power) and the maximum power.

The base station 105, e.g., eNodeB or eNB, can use the report value to estimate how much UL bandwidth the UE 110 can use for a specific slot. In one example, a report may use 64 levels with around 1 dB ranging from [−23, −22, . . . , 40, >40]. In some radio technologies, such as LTE and NR, there may be different triggers for the PHR. One trigger may be to detect or determine that a path loss change is greater than a certain threshold. For example, the UE 110 may calculate the path loss based on a reference signal (RS) power notified by the base station 105 and the measured RS power at an antenna port of the UE 110. If the report value changes over a certain threshold, the UE 110 may transmit the PHR to the base station 105. Another possible trigger may be based on the use of a periodic timer. For example, the UE 110 may transmit the PHR to the base station 105 at after predetermined amount of time (e.g., 100 ms).

In an aspect of this disclosure, the signaling and formatting used for the PHR can be also be used to convey information to the base station 105 in addition to any beamforming that may be performed by the UE 110 in connection with SRS transmissions.

There may be different SRS resource types. A first resource type may be an DL-oriented or UL-centric SRS (similar to LTE), and a second resource type may be a DL-oriented or DL-centric SRS. In some implementations, the UL-centric SRS may also be referred to as codebook-based, non-codebook-based, or UL beam management SRS and may be used for UL MIMO and transmission of data purposes.

In some implementations, the DL-centric SRS may referred to as antenna switching SRS. In an example, these resource types may be used by the base station 105 to beamform on the DL and transmission of channel information (e.g., pre-coding matrix index (PMI), rank indicator (RI), etc.), and are the resource types for which the UE 110 is not expected to receive from the base station 105.

For the DL-oriented SRS, SRS port numbering has one-to-one mapping to the PUSCH port numbering. UL SRSs are intended to be used by the base station 105 to support UL channel-dependent scheduling and link adaption. Based on an UL SRS, the base station 105 may make the scheduling decision and provide the UE 110 information about the resources and the associated transmission settings. The UL-oriented SRS may be used to help maximize the UL signal-to-noise ratio (SNR) or the UL signal-to-interference-plus-noise ratio (SINR).

The DL-oriented SRS is for DL link adaptation and channel-dependent scheduling. SRS beamforming has been considered in the past as a solution and SRS beamformed along directions where the UE 110 can best nullify interference and/or maximize DL SNR or DL SINR. SRS beamforming requires additional support, if/when rank related decisions are being made at the base station 105. Accordingly, power or scaling normalization factors may need to be sent on the UL channel to the base station 105. This disclosure describes aspects of how information about these normalizations factors can be sent to the base station 105 using the PHR signaling mechanisms. That is, the PHR can be used by the base station 105 to recover information associated with the normalization factors that cannot be obtained solely from the beamforming performed by the UE 110.

Regarding the power or scaling normalization factors, these factors can depend on a noise covariance interference matrix that the UE 110 observes on the DL channel. For example, the UE 110 can measure interference over each of n antennas of the UE 110, and can generate a n×n channel covariance matrix representing interference over the n antennas. The UE 110 can determine a beamforming matrix based on the channel covariance matrix for transmitting a beamformed reference signal such as beamformed SRS. The UE 110 can also normalize power for the beamformed RS based on applying a normalization method to the beamforming matrix. The UE 110 can accordingly transmit the beamformed RS to the base station 105 based on the normalized beamforming matrix. In accordance with this disclosure, the UE 110 may also transmit information about the power normalization factors to the base station 105 by using an enhanced PHR. The base station 105 may accordingly determine interference conditions of the channel based on receiving the beamformed RS, and using the power normalization factors associated with the information provided by the enhanced PHR.

In an aspect, the present application describes an enhanced PHR that enables the base station 105 to recover the "per-SRS-port" information that the UE 110 desired to use in order to transmit the SRS ports on the UL channel. However performing such transmissions could result in worse SRS channel estimation at the base station 105.

In an example, the base station 105 assumes that the UE 110 transmits on the UL channel using the same power at each port. The UE 110, however, may want to use different power for each port to show which port (e.g., beamformed direction) is stronger. The UE 110 transmits a PHR to the base station 105, such that the base station 105 may estimate the relative difference in the power scaling that should have been applied.

In one example, assuming that the UE 110 has two SRS ports, and after the scaling normalization, the UE 110 wants to transmit with power $P_1$ and $P_2$, in order to show that one of the ports has more interference than the other and the level of that interference. However, transmitting with lower power per SRS port would result in lower channel estimation, which could possibly result in wrong channel estimation of that channel. Accordingly, the UE 110 transmits with equal or same power in each port to ensure that both ports have the same channel estimation quality. Then, the UE 110 needs to somehow report to the base station 105 how much was the actual power $P_1$ and $P_2$ that the UE 110 wanted to transmit but did not use for transmission.

In a reporting example, the UE 110 may transmit three power headrooms (e.g., in separate reports), such that the eNB can recover the difference of the two ports. In this example, the UE 110 may report:

$$PH^{(1)}=P_{CMax}-P_{PUSCH\ calculated}$$

$$PH^{(2)}=P_1$$

$$PH^{(3)}=P_2$$

where the base station 105 can recover the $P_i$ (i=1, 2) from $PH^{(2)}$ and $PH^{(3)}$.

Note that the actual power headroom that the UE has is still the $PH^{(1)}$, because the UE did not actually apply the power difference in the ports. The $PH^{(2)}$, $PH^{(3)}$ is used just to notify the eNB the power difference of the port sounding that it should have been applied. The $PH^{(2)}$, $PH^{(3)}$ may even be per subband reported, so that the eNB can recover the $P_i$ per subband. If the UE has X ports, then X additional numbers are needed to be transmitted:

$$PH^{(i+1)}=P_i \text{ for } i=1,2,3,\ldots X$$

In some aspects, the same format (e.g., an 8-bit format) to denote each of the PHRs can be used for the additional PHRs.

The UE 110 may transmit three PHRs, such that the base station 105 can recover the difference of the two ports. For example, the UE 110 may report:

$$PH^{(1)}=P_{CMax}-P_{PUSCH\ calculated}$$

$$PH^{(2)}=P_1$$

$$PH^{(3)}=P_2-PH^{(2)}$$

If the UE 110 has X number of ports, then X additional numbers of PHRs are needed to be transmitted:

$$PH^{(2)}=P_1$$

$$PH^{(i+1)}=P_i-PH^{(i)} \text{ for } i=2,3,\ldots X$$

Then, potentially fewer bits are needed (e.g., fewer than 8 bits) for the additional $PH^{(i)}$ for i≥3.

The UE 110 can be configured with many SRS resources. For example, the UE 110 can be configured with multiple UL-oriented SRS resources, multiple DL-oriented SRS resources, or a combination of UL-oriented SRS resources and DL-oriented SRS resources. If the UE 110 was configured and transmitted a DL-oriented SRS resource (even if other types of SRS resources are also configured), then a Type 2 PHR is used, where the Type 2 PHR is a PHR that contains the power normalization factors (or information that conveys the power or scaling normalization factors). Even if the UE 110 has been configured with a DL-oriented SRS resource, it is likely the power normalizations factors may not need to be transmitted because the interference across ports is approximately the same. Then, the UE 110 may use the Type 1 PHR.

In some implementations, if the UE 110 is only configured with UL-oriented SRS resources, then the Type 1 PHR can be used.

In some implementations, there can be one bit that is used to indicate a switch between the Type 1 PHR and the Type 2 PHR.

In some implementations, the Type 2 PHR may be triggered whenever the UE 110 transmits a DL-centric SRS resource and senses that any of the power normalization scalings have significantly changed.

Figure 2:
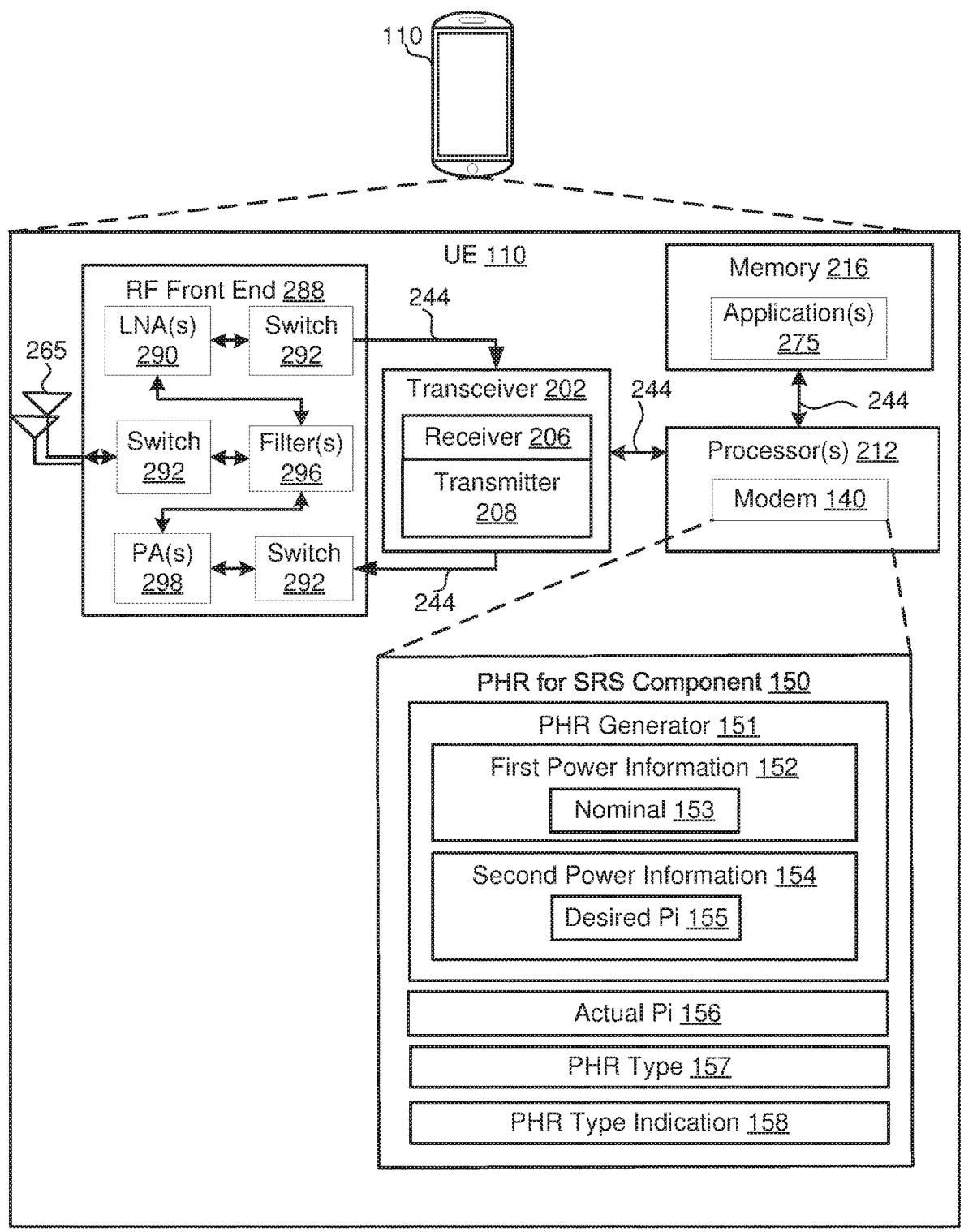
FIG. 2 is a schematic diagram of example components of the UE of FIG. 1.

Referring to FIG. 2, one example of an implementation of UE 110 may include a variety of components, some of which have already been described above, but including components such as one or more processors 212 and memory 216 and transceiver 202 in communication via one or more buses 244, which may operate in conjunction with modem 140 and PHR for SRS component 150 to enable one or more of the functions described herein that provides an enhanced PHR for feeding back beamformed SRS power scaling. Further, the one or more processors 212, a modem 214, the memory 216, a transceiver 202, an RF front end 288, and one or more antennas 286, may be configured to support voice and/or data calls (simultaneously or non-simultaneously) in one or more radio access technologies.

In an aspect, the one or more processors 212 can include the modem 214 that uses one or more modem processors. The various functions related to the PHR for SRS component 150 may be included in the modem 140 and/or the processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with the transceiver 202. In other aspects, some of the features of the one or more processors 212 and/or the modem 140 associated with the PHR for SRS component 150 may be performed by the transceiver 202.

Also, the memory 216 may be configured to store data used herein and/or local versions of applications 275 or the PHR for SRS component 150 and/or one or more of its subcomponents being executed by at least one of the one or more processors 212. The memory 216 can include any type of computer-readable medium usable by a computer or at least one of the one or more processors 212, such as random access memory (RAM), read only memory (ROM), tapes, magnetic discs, optical discs, volatile memory, non-volatile memory, and any combination thereof. In an aspect, for example, the memory 216 may be a non-transitory computer-readable storage medium that stores one or more computer-executable codes defining the PHR for SRS component 150 and/or one or more of its subcomponents, and/or data associated therewith, when the UE 110 is operating at least one of the one or more processors 212 to execute the PHR for SRS component 150 and/or one or more of its subcomponents.

The transceiver 202 may include at least one receiver 206 and at least one transmitter 208. The receiver 206 may include hardware, firmware, and/or software code executable by a processor for receiving data, the code comprising instructions and being stored in a memory (e.g., computer-readable medium). The receiver 206 may be, for example, an RF receiver. In an aspect, the receiver 206 may receive signals transmitted by at least one of the base stations 105. Additionally, the receiver 206 may process such received signals, and also may obtain measurements of the signals, such as, but not limited to, energy-to-interference ratio (Ec/Io), SNR, reference signal received power (RSRP), received signal strength indicator (RSSI), etc. The transmitter 208 may include hardware, firmware, and/or software code executable by a processor for transmitting data, the code comprising instructions and being stored in a memory (e.g., computer-readable medium). A suitable example of the transmitter 208 may including, but is not limited to, an RF transmitter.

Moreover, in an aspect, the UE 110 may include the RF front end 288, which may operate in communication with the one or more antennas 265 and the transceiver 202 for receiving and transmitting radio transmissions, for example, wireless communications transmitted by at least one of the base stations 105 or wireless transmissions transmitted by the UE 110. The RF front end 288 may be connected to the one or more antennas 265 and can include one or more low-noise amplifiers (LNAs) 290, one or more switches 292, one or more power amplifiers (PAs) 298, and one or more filters 296 for transmitting and receiving RF signals.

In an aspect, the LNA 290 can amplify a received signal at a desired output level. In an aspect, each of the LNAs 290 may have a specified minimum and maximum gain values. In an aspect, the RF front end 288 may use the one or more switches 292 to select a particular LNA 290 and its specified gain value based on a desired gain value for a particular application.

Further, for example, the one or more PA(s) 298 may be used by the RF front end 288 to amplify a signal for an RF output at a desired output power level. In an aspect, each of the one or more PA(s) 298 may have specified minimum and maximum gain values. In an aspect, the RF front end 288 may use the one or more switches 292 to select a particular PA 298 and its specified gain value based on a desired gain value for a particular application.

Also, for example, the one or more filters 296 can be used by the RF front end 288 to filter a received signal to obtain an input RF signal. Similarly, in an aspect, for example, a respective filter 296 can be used to filter an output from a respective PA 298 to produce an output signal for transmission. In an aspect, each of the one or more filters 296 can be connected to a specific LNA 290 and/or PA 298. In an aspect, the RF front end 288 can use the one or more switches 292 to select a transmit or receive path using a specified filter 296, LNA 290, and/or PA 298, based on a configuration as specified by the transceiver 202 and/or the processor 212.

As such, the transceiver 202 may be configured to transmit and receive wireless signals through the one or more antennas 265 via the RF front end 288. In an aspect, the transceiver 202 may be tuned to operate at specified frequencies such that the UE 110 can communicate with, for example, one or more of the base stations 105 or one or more cells associated with one or more of the base stations 105. In an aspect, for example, the modem 140 can configure the transceiver 202 to operate at a specified frequency and power level based on UE configuration of the UE 110 and the communication protocol used by the modem 140.

In an aspect, the modem 140 can be a multiband-multimode modem, which can process digital data and communicate with the transceiver 202 such that the digital data is sent and received using the transceiver 202. In an aspect, the modem 140 can be multiband and be configured to support multiple frequency bands for a specific communications protocol. In an aspect, the modem 140 can be multimode and be configured to support multiple operating networks and communications protocols. In an aspect, the modem 140 can control one or more components of the UE 110 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with the UE 110 as provided by the network during cell selection and/or cell reselection.

The PHR for SRS component 150 can include multiple subcomponents. For example, the PHR for SRS component 150 can include a PHR generator 151 that generates a PHR including first power information 152 and second power information 154. The first power information 152 includes a nominal power headroom value 153, such as $PH^{(1)}$ as described above. The second power information 154 includes additional power headroom values, such as $PH^{(2)}, \ldots, PH^{(X+1)}$, where X is the number of SRS ports in the UE 110. The information in the second power information 154 (e.g., the power headroom values) can indicate the desired transmit power 155 for the SRS ports, which is different from the actual transmit power 156 for the SRS ports. The desired transmit power 155 can be provided in the form of absolute transmit power values (e.g., $P_1, \ldots, P_X$) and/or in the form of differential transmit power values (e.g., $PH^{(2)} = P_1$ and $PH^{(i+1)} = P_i - PH^{(i)}$, for $i = 2, 3, \ldots, X$).

The PHR for SRS component 150 can also include a PHR type 157 that identifies or selects a type of the PHR from the Type 1 PHR and the Type 2 PHR. The PHR type indication 158 can also be included in the PHR for SRS component 150 and can be used to provide an indication of the PHR type.

Figure 3:
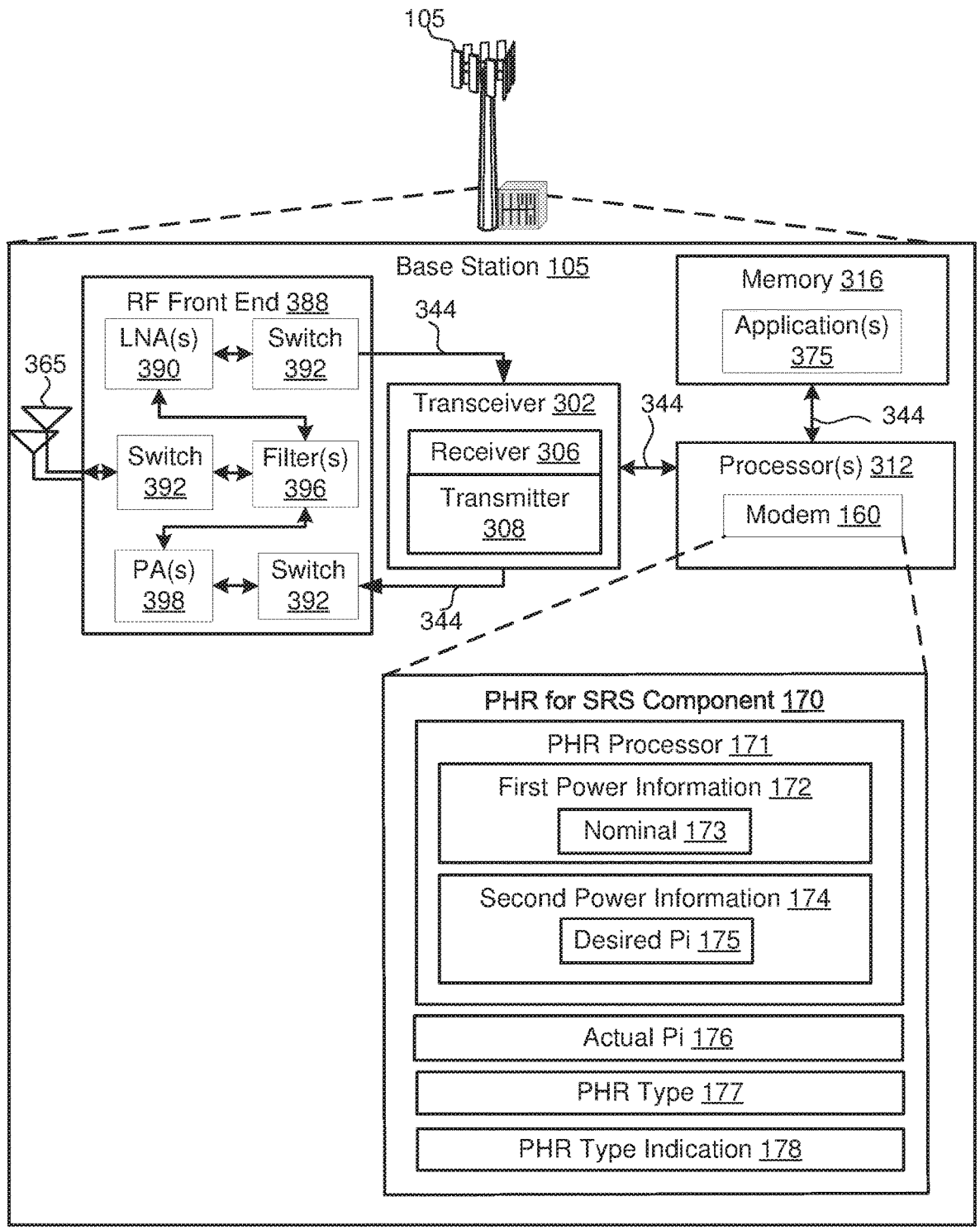
FIG. 3 is a schematic diagram of example components of the base station of FIG. 1.

Referring to FIG. 3, one example of an implementation of the base station 105 may include a variety of components, some of which have already been described above, but including components such as one or more processors 312 and memory 316 and transceiver 302 in communication via one or more buses 344, which may operate in conjunction with the modem 160 and the PHR for SRS component 170 to enable one or more of the functions described herein related to receiving and processing an enhanced PHR for feeding back beamformed SRS power scaling. The base station 105 may provide configuration information and/or other information in response to the PHR.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of UE 110, as described above, but configured or otherwise programmed for base station operations as opposed to UE operations.

The PHR for SRS component 170 can include multiple subcomponents. For example, the PHR for SRS component 170 can include a PHR processor 171 that receives and processes a PHR including first power information 172 and second power information 174. The first power information 172 includes a nominal power headroom value 173, such as $PH^{(1)}$ as described above. The second power information 174 includes additional power headroom values, such as $PH^{(2)}, \ldots, PH^{(X+1)}$, where X is the number of SRS ports in the UE 110. The information in the second power information 174 (e.g., the power headroom values) can indicate the desired transmit power 175 for the SRS ports, which is different from the actual transmit power 176 for the SRS ports. The desired transmit power 155 can be provided in the form of absolute transmit power values (e.g., $P_1, \ldots, P_X$) and/or in the form of differential transmit power values (e.g., $PH^{(2)} = P_1$ and $PH^{(i+1)} = P_i - PH^{(i)}$, for $i = 2, 3, \ldots, X$). The PHR for SRS component 170 is therefore configured to identify the desired transmit powers for the SRS ports from the second power information 174 in the received PHR.

The PHR for SRS component 170 can also include a PHR type 177 that identifies a type of the PHR from the Type 1 PHR and the Type 2 PHR. The PHR type indication 178 can also be included in the PHR for SRS component 170 and can be used to receive and process an indication of the PHR type.

Figure 4:
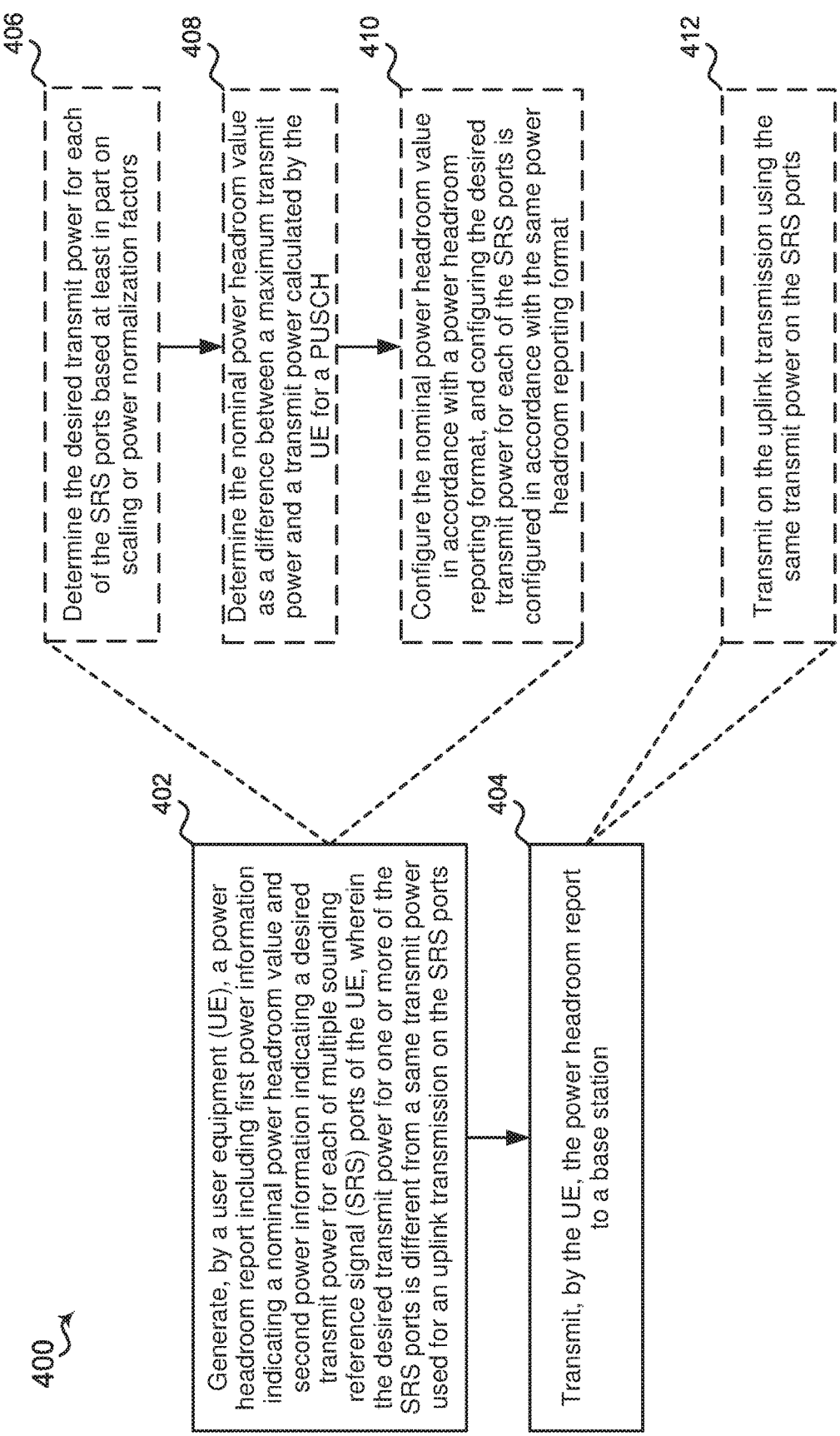
FIG. 4 is a flow diagram of an example of a method for wireless communications.

Referring to FIG. 4, for example, a method 400 for wireless communications in operating the UE 110 according to the above-described aspects to provide enhanced PHR for feeding back beamformed SRS power scaling includes one or more of the herein-defined actions.

For example, at 402, the method 400 includes generating, at a UE, a PHR including first power information (e.g., $PH^{(1)}$) indicating a nominal power headroom value and second power information indicating a desired transmit power for each of multiple SRS ports of the UE (e.g., $PH^{(2)}, \ldots, PH^{(X)}$), where the desired transmit power for one or more of the SRS ports is different from a same transmit power used for an uplink transmission on the SRS ports. For instance, in an aspect, the UE 110 may execute the processor 212, the modem 140, and/or one or more subcomponents of the PHR for SRS component 150, to generate the PHR having the first power information and the second power information.

At 404, the method 400 includes transmitting, by the UE, the PHR to a base station. For instance, in an aspect, the UE 110 may execute the processor 212, the modem 140, one or more subcomponents of the PHR for SRS component 150, the transceiver 202, and/or the RF front end 288 to transmit the PHR to the base station 105, as described herein.

In another aspect, the method 400 may optionally include, at 406, determining the desired transmit power for each of the SRS ports based at least in part on scaling or power normalization factors. These factors can depend on a noise covariance interference matrix that the UE observes.

In another aspect, the method 400 may optionally include, at 408, determining the nominal power headroom value as a difference between a maximum transmit power (e.g., $P_{CMax}$) and a transmit power calculated by the UE for a PUSCH (e.g., $P_{PUSCHcalculated}$).

In another aspect of the method 400, the second power information indicates the desired transmit power for each of the SRS ports per subband.

In another aspect, the method 400 may optionally include, at 410, configuring the nominal power headroom value in accordance with a power headroom reporting format, and configuring the desired transmit power for each of the SRS ports is configured in accordance with the same power headroom reporting format. For example, $PH^{(1)}$ can be configured using an 8-bit format and each of $PH^{(2)}, \ldots, PH^{(X+1)}$ (when the UE has X ports) can also be configured using an 8-bit format. It is to be understood that if formats using more or fewer than 8-bit are possible, then the nominal power headroom value and the desired transmit powers can all use such a format.

In another aspect of the method 400, the second power information can include a power headroom value for each of the SRS ports, where each power headroom value is indicative of an absolute value of the corresponding desired transmit power (e.g., $PH^{(2)}=P_1, \ldots, PH^{(X+1)}=P_X$).

In another aspect of the method 400, the second power information can include a power headroom value for each of the SRS ports, the power headroom value of a first SRS port being indicative of an absolute value of the desired transmit power of the first SRS port (e.g., $PH^{(2)}=P_1$), and the power headroom value of any remaining SRS port being indicative of a difference in the desired transmit power between the SRS port and a previous SRS port (e.g., $PH^{(i+1)}=P_i-PH^{(i)}$, where i=2, 3, . . . , X). At least one of the power headroom values for the SRS ports can be configured to use a power headroom reporting format with fewer bits than a power headroom reporting format used for the nominal power headroom value. That is, because what is being reported is a difference value, fewer bit may be needed to represent the difference value compared to a number of bits needed to represent an absolute value.

In another aspect of the method 400, the second power information includes a power headroom value for each of the SRS ports, the power headroom value of a first SRS port being indicative of an absolute value of the desired transmit power of the first SRS port (e.g., $PH^{(2)}=P_1$), and the power headroom value of any remaining SRS port being indicative of a difference in the desired transmit power between the SRS port and the first SRS port (e.g., $PH^{(i+1)}=P_i-PH^{(2)}$, where i=2, 3, . . . , X). While the first SRS port is being used as a reference SRS port in this example, a different SRS port can be used. At least one of the power headroom values for the SRS ports can be configured to use a power headroom reporting format with fewer bits than a power headroom reporting format used for the nominal power headroom value.

In another aspect of the method 400, the PHR is a Type 2 PHR associated with DL-oriented SRS resources configured to support DL channel-dependent scheduling and link adaptation. The Type 2 PHR is different from a Type 1 PHR associated with UL-oriented SRS resources configured to support UL channel-dependent scheduling and link adaptation. In yet another aspect, the UE can generate an indication that the UE is to change from using the Type 2 PHR to the Type 1 PHR, and can transmit the indication to the base station. Such indication can be a single-bit indication.

In another aspect, the method 400 may optionally include, at 412, transmitting on the UL transmission using the same transmit power on the SRS ports.

Figure 5:
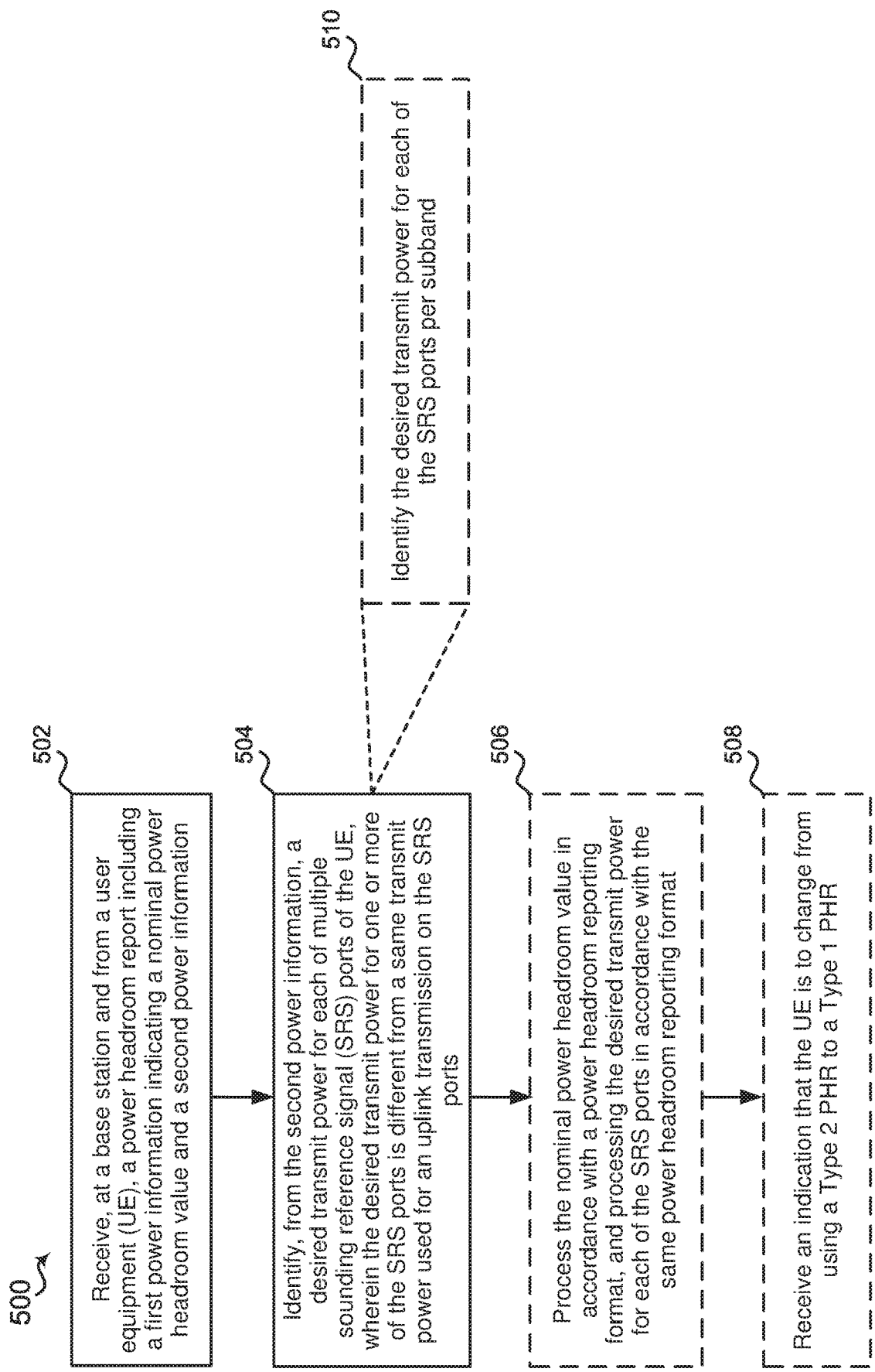
FIG. 5 is a flow diagram of another example of a method for wireless communications

Referring to FIG. 5, for example, a method 500 for wireless communications in operating base station 105 according to the above-described aspects to receive and process enhanced PHR for feeding back beamformed SRS power scaling includes one or more of the herein-defined actions.

For example, at 502, the method 500 includes receiving, at a base station and from a UE, a PHR including first power information indicating a nominal power headroom value and second power information. For instance, in an aspect, the base station 105 may execute the processor 312, the modem 160, one or more of the subcomponents of the PHR for SRS component 170, the transceiver 302, and/or the RF front end 388 to receive the PHR, as described herein.

At 504, the method 500 includes identifying, from the second power information, a desired transmit power for each of multiple SRS ports of the UE, where the desired transmit power for one or more of the SRS ports is different from a same transmit power used for an UL transmission on the SRS ports. For instance, in an aspect, the base station 105 may execute the processor 312, the modem 160, and/or one or more of the subcomponents of the PHR for SRS component 170 to identify and process the desired transmit powers, as described herein.

In some aspects, the base station 105 may execute the processor 312, the modem 160, and/or one or more of the subcomponents of the PHR for SRS component 170 to configure the SRS ports as part of an SRS resource configuration. In this example, the transmit power is configured for the SRS resource, and then using the PHR report, each port of the SRS resource may be transmitted with a desired power which is different for each port.

In some aspects, may execute the processor 312, the modem 160, and/or one or more of the subcomponents of the PHR for SRS component 170 to configure a set of SRS resources using the same transmit power, where all the SRS ports of each SRS resource of the set of SRS resources is transmitted using the desired transmit powers. In this example, the desired transmit power of the SRS ports may be different from the same transmit power of each of the SRS resources within the set of SRS resources.

In another aspect of the method 500, the desired transmit power for each of the SRS ports is based at least in part on scaling normalization factors. For example, as described above, the power or scaling normalization factors can depend on a noise covariance interference matrix that the UE 110 observes.

In another aspect of the method 500, the UL transmission uses the same transmit power in each of the SRS ports.

In another aspect of the method 500, the nominal power headroom value (e.g., $PH^{(1)}$) is a difference between a maximum transmit power and a transmit power calculated by the UE for a PUSCH.

In some implementations, the method 500, at 506, optionally includes processing the nominal power headroom value in accordance with a power headroom reporting format, and processing the desired transmit power for each of the SRS ports in accordance with the same power headroom reporting format. The power headroom reporting format can be based on an 8-bit format. It is to be understood that power headroom reporting formats with more or fewer bits can also be used.

In another aspect of the method 500, the second power information can include a power headroom value for each of the SRS ports, each power headroom value being indicative of an absolute value of the corresponding desired transmit power.

In another aspect of the method 500, the second power information can include a power headroom value for each of the SRS ports, the power headroom value of a first SRS port being indicative of an absolute value of the desired transmit power of the first SRS port, and the power headroom value of any remaining SRS port being indicative of a difference in the desired transmit power between the SRS port and a previous SRS port. At least one of the power headroom values for the SRS ports is configured to use a power headroom reporting format with fewer bits than a power headroom reporting format used for the nominal power headroom value.

In another aspect of the method 500, the second power information can include a power headroom value for each of the SRS ports, the power headroom value of a first SRS port being indicative of an absolute value of the desired transmit power of the first SRS port, and the power headroom value of any remaining SRS port being indicative of a difference in the desired transmit power between the SRS port and the first SRS port. At least one of the power headroom values for the SRS ports is configured to use a power headroom reporting format with fewer bits than a power headroom reporting format used for the nominal power headroom value.

In another aspect of the method 500, the PHR can be a Type 2 PHR associated with DL-oriented SRS resources configured to support DL channel-dependent scheduling and link adaptation. The Type 2 PHR is different from a Type 1 PHR associated with UL-oriented SRS resources configured to support UL channel-dependent scheduling and link adaptation.

In some implementations, the method 500, at 508 includes receiving, by the base station, an indication that the UE is to change from using a Type 2 PHR to a Type 1 PHR. The indication can be a single-bit indication.

In another aspect, the identifying the desired transmit power for each of the SRS ports of the method 500 may optionally include, at 510, identifying the desired transmit power for each of the SRS ports per subband.

Although the operations or methods described above are presented in a particular order and/or as being performed by an example component, it should be understood that the ordering of the actions and the components performing the actions may be varied, depending on the implementation. In addition, aspects of any one of the methods described above can be combined with aspects of any other of the methods.

The present disclosure also includes apparatuses having components or configured to execute or means for executing the above-described methods, and computer-readable mediums storing one or more codes executable by a processor to perform the above-described methods.

In an implementation, an apparatus, such as the UE 110, may include means for generating a power headroom report including first power information indicating a nominal power headroom value and second power information indicating a desired transmit power for each of multiple sounding reference signal (SRS) ports of the UE, wherein the desired transmit power for one or more of the SRS ports is different from a same transmit power used for an uplink transmission on the SRS ports; and means for transmitting, by the UE, the power headroom report to a base station.

In another implementation, an apparatus, such as the base station 105, may include means for receiving, from a UE, a power headroom report including a first power information indicating a nominal power headroom value and a second power information; and means for identifying, from the second power information, a desired transmit power for each of multiple sounding reference signal (SRS) ports of the UE, wherein the desired transmit power for one or more of the SRS ports is different from a same transmit power used for an uplink transmission on the SRS ports.

In another implementation, a computer-readable medium storing computer code executable by a processor for a UE, such as the UE 110, may include code for generating a power headroom report including a first power information indicating a nominal power headroom value and a second power information indicating a desired transmit power for each of multiple sounding reference signal (SRS) ports of the UE, wherein the desired transmit power for one or more of the SRS ports is different from a same transmit power used for an uplink transmission on the SRS ports; and code for transmitting, by the UE, the power headroom report to a base station.

In another implementation, a computer-readable medium storing computer code executable by a processor for a base station, such as the base station 105, may include code for receiving, at a base station and from a UE, a power headroom report including a first power information indicating a nominal power headroom value and a second power information; and code for identifying, from the second power information, a desired transmit power for each of multiple sounding reference signal (SRS) ports of the UE, wherein the desired transmit power for one or more of the SRS ports is different from a same transmit power used for an uplink transmission on the SRS ports.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method for wireless communications, comprising:
generating, by a user equipment (UE), a power headroom report including first power information indicating a nominal power headroom value corresponding to a transmit power for an uplink transmission on a plurality of sounding reference signal (SRS) ports of the UE and second power information indicating desired transmit power values for each of the plurality of SRS ports for a base station to use in place of the nominal power headroom value, wherein at least one of the desired transmit power values is different from the nominal power headroom value; and
transmitting, by the UE, the power headroom report to the base station.

2. The method of claim 1, further comprising determining the desired transmit power values based at least in part on scaling normalization factors.

3. The method of claim 1, further comprising transmitting the uplink transmission using the transmit power on the plurality of SRS ports.

4. The method of claim 1, further comprising determining the nominal power headroom value as a difference between a maximum transmit power and the transmit power calculated by the UE for a physical uplink shared channel (PUSCH).

5. The method of claim 1, wherein the desired transmit power values include transmit power values for each of the plurality of SRS ports per subband.

6. The method of claim 1, wherein generating the power headroom report further comprises:
configuring the nominal power headroom value in accordance with a power headroom reporting format, and
configuring the desired transmit power values in accordance with the power headroom reporting format.

7. The method of claim 1, wherein the second power information includes power headroom values for the plurality of SRS ports, each of the power headroom values having a corresponding SRS port of the plurality of SRS ports, each of the power headroom values being indicative of an absolute value of a corresponding desired transmit power value of the desired transmit power values.

8. The method of claim 1, wherein the second power information includes power headroom values for the plurality of SRS ports, each of the power headroom values having a corresponding SRS port of the plurality of SRS ports, a power headroom value of a first SRS port of the plurality of SRS ports being indicative of an absolute value of a first desired transmit power value of the desired transmit power values of the first SRS port, and a power headroom value of any other SRS port of the plurality of SRS ports being indicative of a difference between a second desired transmit power value of the desired transmit power values corresponding to the any other SRS port and a second power headroom value corresponding to a previous SRS port of the plurality of SRS ports.

9. The method of claim 8, wherein at least one of the power headroom values for the plurality of SRS ports is configured to use a power headroom reporting format with fewer bits than a power headroom reporting format used for the nominal power headroom value.

10. The method of claim 1, wherein the second power information includes power headroom values for the plurality of SRS ports, each of the power headroom values having a corresponding SRS port of the plurality of SRS ports, a power headroom value of a first SRS port of the plurality of SRS ports being indicative of an absolute value of a first desired transmit power value of the desired transmit power values of the first SRS port, and a power headroom value of any other SRS port of the plurality of SRS ports being indicative of a difference between a second desired transmit power value of the desired transmit power values corresponding to the any other SRS port and the power headroom value of the first SRS port.

11. The method of claim 10, wherein at least one of the power headroom values for the plurality of SRS ports is configured to use a power headroom reporting format with fewer bits than a power headroom reporting format used for the nominal power headroom value.

12. The method of claim 1, wherein the power headroom report is a Type 2 power headroom report (Type 2 PHR) associated with downlink-oriented SRS resources configured to support downlink channel-dependent scheduling and link adaptation.

13. The method of claim 12, wherein the Type 2 PHR is different from a Type 1 PHR associated with uplink-oriented SRS resources configured to support uplink channel-dependent scheduling and link adaptation.

14. The method of claim 13, further comprising:
generating an indication that the UE is to change from using the Type 2 PHR to the Type 1 PHR; and
transmitting the indication to the base station.

15. A method for wireless communications, comprising:
receiving, at a base station and from a user equipment (UE), a power headroom report including first power information indicating a nominal power headroom value corresponding to a transmit power for an uplink transmission on a plurality of sounding reference signal (SRS) ports of the UE and second power information; and
identifying, from the second power information, desired transmit power values for each of the plurality of SRS ports for the base station to use in place of the nominal power headroom value, wherein at least one of the desired transmit power values is different from the transmit power.

16. The method of claim 15, wherein the desired transmit power values are based at least in part on scaling normalization factors.

17. The method of claim 15, wherein the uplink transmission uses the transmit power for each of the plurality of SRS ports.

18. The method of claim 15, wherein the nominal power headroom value is a difference between a maximum transmit power and the transmit power calculated by the UE for a physical uplink shared channel (PUSCH).

19. The method of claim 15, wherein identifying the desired transmit power values for each of the SRS ports includes identifying the desired transmit power values for each of the plurality of SRS ports per subband.

20. The method of claim 15, further comprising:
processing the nominal power headroom value in accordance with a power headroom reporting format; and
processing the desired transmit power values in accordance with the power headroom reporting format.

21. The method of claim 15, wherein the second power information includes power headroom values for the plurality of SRS ports, each of the power headroom values having a corresponding SRS port of the plurality of SRS ports, each power headroom value being indicative of an absolute value of a corresponding desired transmit power value of the desired transmit power values.

22. The method of claim 15, wherein the second power information includes power headroom values for the plurality of SRS ports, each of the power headroom values having a corresponding SRS port of the plurality of SRS ports, a power headroom value of a first SRS port of the plurality of SRS ports being indicative of an absolute value of a first desired transmit power value of the desired transmit power values of the first SRS port, and a power headroom value of any other SRS port of the plurality of SRS ports being indicative of a difference between a second desired transmit power value of the desired transmit power values corresponding to the any other SRS port and a second power headroom value corresponding to a previous SRS port of the plurality of SRS ports.

23. The method of claim 22, wherein at least one of the power headroom values for the plurality of SRS ports is configured to use a power headroom reporting format with fewer bits than a power headroom reporting format used for the nominal power headroom value.

24. The method of claim 15, wherein the second power information includes power headroom values for the plurality of SRS ports, each of the power headroom values having a corresponding SRS port of the plurality of SRS ports, a power headroom value of a first SRS port of the plurality of SRS ports being indicative of an absolute value of a first desired transmit power value of the desired transmit power values of the first SRS port, and a power headroom value of any one SRS port of the plurality of SRS ports being indicative of a difference between a second desired transmit power value of the desired transmit power values corresponding to the any one SRS port and the power headroom value of the first SRS port.

25. The method of claim 24, wherein at least one of the power headroom values for the plurality of SRS ports is configured to use a power headroom reporting format with fewer bits than a power headroom reporting format used for the nominal power headroom value.

26. The method of claim 15, wherein the power headroom report is a Type 2 power headroom report (Type 2 PHR) associated with downlink-oriented SRS resources configured to support downlink channel-dependent scheduling and link adaptation.

27. The method of claim 26, wherein the Type 2 PHR is different from a Type 1 PHR associated with uplink-oriented SRS resources configured to support uplink channel-dependent scheduling and link adaptation.

28. The method of claim 27, further comprising receiving an indication that the UE is to change from using the Type 2 PHR to the Type 1 PHR.

29. An apparatus for wireless communications, comprising:
a memory storing instructions; and
a processor coupled with the memory and configured to:
generate, by a user equipment (UE), a power headroom report including first power information indicating a nominal power headroom value corresponding to a transmit power for an uplink transmission on a plurality of sounding reference signal (SRS) ports of the UE and second power information indicating desired transmit power values for each of the plurality of SRS ports for a base station to use in place of the nominal power headroom value, wherein at least one of the desired transmit power values is different from the transmit power; and
transmit, by the UE, the power headroom report to the base station.

30. An apparatus for wireless communications, comprising:
a memory storing instructions; and
a processor coupled with the memory and configured to:
receive, at a base station and from a user equipment (UE), a power headroom report including first power information including information of a nominal power headroom value indicating a transmit power for an uplink transmission on a plurality of sounding reference signal (SRS) ports of the UE and second power information; and
identify, from the second power information, desired transmit power values for each of the plurality of SRS ports for the base station to use in place of the nominal power headroom value, wherein at least one of the desired transmit power values is different from the transmit power.

* * * * *